358-190. OR 3,752,903 SR

United States Patent [19]

Newman et al.

[11] 3,752,903
[45] Aug. 14, 1973

[54] PILOT VOLTAGE SUPPLY & VOLTAGE REGULATION MEANS

[75] Inventors: Robert H. Newman, Norfolk; Mervyn M. Pluck, Portsmouth, both of Va.

[73] Assignee: General Electric Company, Portsmouth, Va.

[22] Filed: Nov. 8, 1971

[21] Appl. No.: 196,267

[52] U.S. Cl. ........................ 178/7.5 R, 178/DIG. 11
[51] Int. Cl. ........................ H04n 5/44
[58] Field of Search ........................ 178/7.3 R, 7.5 R, 178/DIG. 11; 307/297

[56] References Cited

UNITED STATES PATENTS

| | | | |
|---|---|---|---|
| 3,621,134 | 11/1971 | Waring | 178/DIG. 11 |
| 3,309,596 | 3/1967 | Limley | 307/297 |
| 3,250,981 | 5/1966 | Marks | 307/297 |
| 2,559,078 | 7/1951 | Kell | 178/7.5 R |
| 3,022,457 | 2/1962 | Doan | 307/297 |
| 3,323,038 | 5/1967 | Greenberg et al. | 307/297 |
| 3,470,451 | 9/1969 | Arase | 307/297 |
| 3,217,101 | 11/1965 | Mattingly | 178/7.3 R |

FOREIGN PATENTS OR APPLICATIONS

| | | | |
|---|---|---|---|
| 385,932 | 3/1965 | Switzerland | 307/297 |
| 1,041,370 | 9/1966 | Great Britain | 178/DIG. 11 |

*Primary Examiner*—Robert L. Griffin
*Assistant Examiner*—George G. Stellar
*Attorney*—Frederick W. Powers, III et al.

[57] ABSTRACT

Means for energizing an oscillator, and for regulating a voltage derived from the oscillator output. A pilot voltage is developed across a zener diode and applied to an oscillator, and to the base of a regulating transistor by means of a reverse-poled diode. Unregulated voltages are applied to the cathode of the zener diode and to the base of the regulating transistor. The pilot voltage arising across the zener diode energizes the oscillator which drives circuitry for producing scansion signals to deflect an electron beam within a cathode ray tube. The scansion signals are also applied to the collector of the regulating transistor after being rectified and smoothed. The regulating transistor is controlled by a base voltage derived across the zener diode and uses the rectified scansion signal voltage to produce a relatively low-impedance, regulated DC voltage at the emitter terminal thereof.

3 Claims, 1 Drawing Figure

T5117

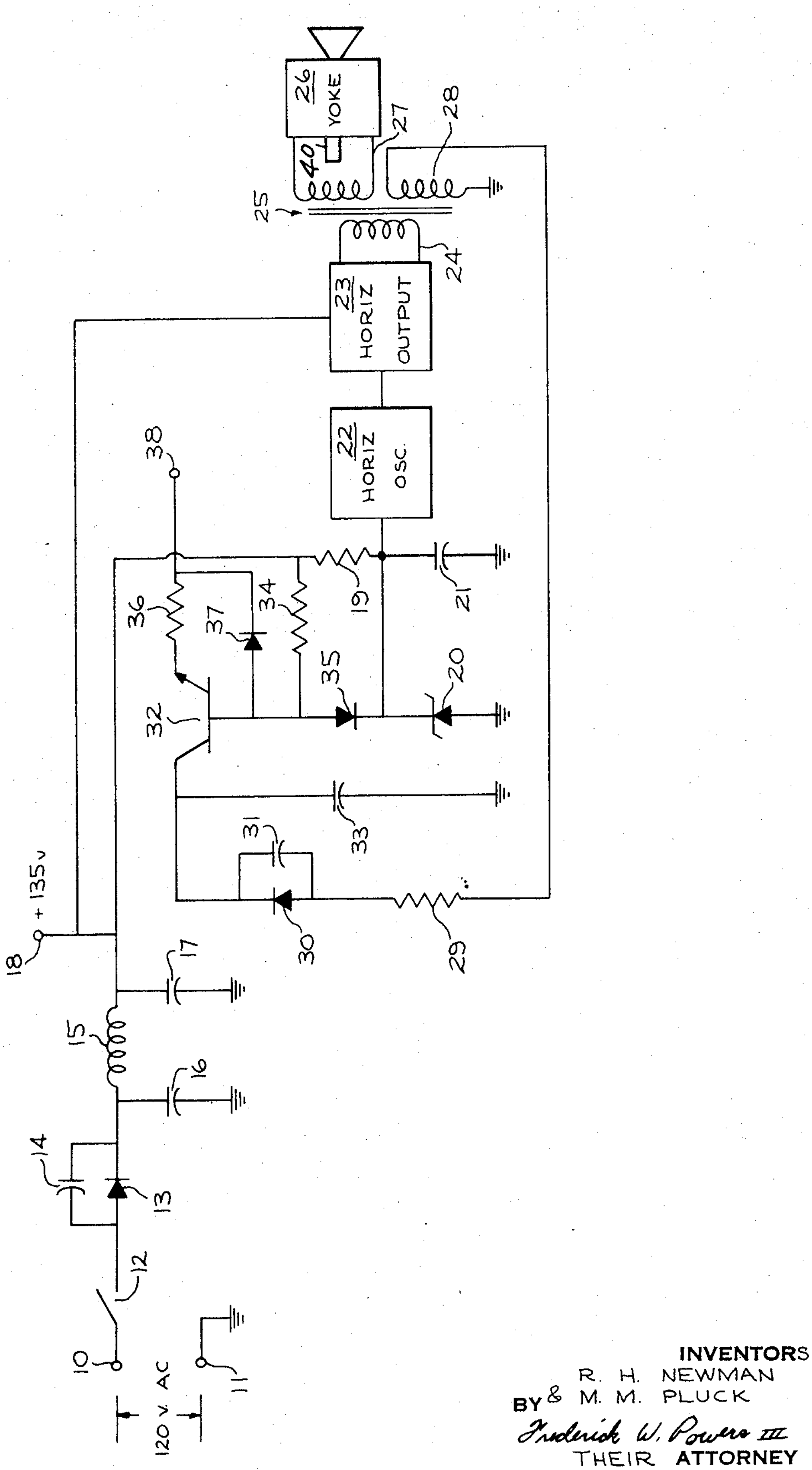
INVENTORS
R. H. NEWMAN
BY & M. M. PLUCK
Frederick W. Powers III
THEIR ATTORNEY

PILOT VOLTAGE SUPPLY & VOLTAGE REGULATION MEANS

BACKGROUND OF THE INVENTION

The present invention relates generally to voltage control systems and, more particularly, to means for deriving a fixed pilot voltage for energizing circuit means and for regulating pulses derived from the output of the circuit means.

In an electronic device such as a television receiver, it is necessary that a plurality of voltages of various levels be derived from a common power supply for operating different parts of the device. A common method for deriving different desired voltage levels within television receivers is to provide a power transformer with a plurality of secondary windings, or with a single secondary winding having plurality of tapped segments. AC voltages of different levels are derived from suitable taps or segments of the secondary winding, and then suitable rectification may be provided if necessary to provide DC power.

The disadvantages of this approach are apparent. A transformer of the size necessary to power an entire television receiver, and to include the various secondary windings necessary to provide a plurality of supply voltages, is a relatively costly device. Further, in modern, compact television receivers such a transformer occupies an undesirable amount of space and adds substantially to the overall weight. Size and weight are important considerations in the design of portable television receivers.

With the advent of transistorized or solid-state television receivers, it has been necessary to provide closely regulated DC voltages at relatively low levels. In the past, voltages approximating line voltage could often be used in receivers utilizing vacuum tubes because of the inherent ability of such tubes to operate at relatively high voltages. However transistors, being generally low-power devices when compared with prior-art receiving tubes, require substantially lower operating voltages. Unfortunately, by providing large, heavy transformers for deriving the requisite lower supply voltages many of the advantages gained by the use of transistors are negated.

Another approach in deriving the required low-voltage DC for transistorized television receivers is to apply a substantially line-level voltage across a device producing a constant voltage drop thereacross, such as the well-known zener diode. While such an approach has much to recommend it, it is relatively inefficient since a good deal of the power thus applied is bled off through the zener diode and absorbed by the resistor in series therewith rather than being utilized to energize the receiver. Moreover, the relatively large zener diodes required to supply power to an entire receiver are comparatively costly items.

While other, auxiliary power sources which derive relatively low voltages from internally generated signals have been devised, it is nonetheless necessary in a completely transistorized television receiver to provide a "pilot" voltage for initially energizing those portions of the system from which the auxiliary voltage is derived. This implies the use of two separate systems for deriving the requisite low voltages, with their attendant complexity and expense.

It will therefore be seen that it would be desirable to provide a television receiver with means for deriving a regulated low D.C. voltage while still providing the initial low-voltage power necessary to initiate the operation of certain portions of the receiver circuit.

It is therefore an object of the present invention to provide improved means for deriving a regulated voltage in a television receiver.

It is a further object of the present invention to provide means for producing both a first, pilot voltage to energize certain circuitry and a second, regulated voltage which is derived from the circuitry.

It is another object of the present invention to provide means for energizing an oscillator, and for deriving a regulated voltage from the output of the oscillator.

It is still another object of the invention to provide means for energizing a horizontal oscillator in a television receiver, and for deriving a regulated voltage from scan signals derived from the oscillator output.

SUMMARY OF THE INVENTION

Briefly stated, in accordance with one aspect of the invention, the foregoing objects are achieved by applying an unregulated voltage to a device supporting a constant voltage drop thereacross, the voltage drop being utilized as a pilot voltage for energizing an oscillator within the receiver. A regulating transistor has its base coupled to the device by means of a diode, preventing the base-emitter junction of the transistor from diverting current from the device. A source of unregulated voltage is coupled to the base terminal of the transistor for supporting the conduction thereof, the base terminal voltage being effectively regulated by the constant voltage drop across the aforementioned device. Periodic signals derived from the oscillator output are then applied to one side of the transistor, a regulated voltage being produced at the other side thereof due to the constant potential applied to the base terminal.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the attached drawing wherein the single figure is a schematic diagram of a presently preferred form of the invention, including selected portions of a television receiver circuit.

DESCRIPTION OF A PREFERRED EMBODIMENT

Referring now to the drawing, there are shown selected portions of a television receiver circuit including the power supply section thereof. A line voltage suitable for energizing the receiver, commonly 120 volts AC, is impressed across input terminals 10 and 11. Terminal 11 is coupled to ground or reference potential, so that the voltage appearing upon terminal 10 may be regarded as that utilized for energizing the receiver. When on-off switch 12 is closed, the line voltage power traverses a rectifier 13, which is shunted by a damping capacitor 14, and flows through a pi filter comprising inductor 15 and capacitors 16 and 17. The resulting rectified and filtered current may be applied through terminal 18 to portions of the receiver circuit (not shown) which require relatively high voltages. Other means, however, must be provided for deriving the lower voltages necessary for energizing certain solid state elements of the receiver circuit. To this end, the rectified high voltage is applied by way of a resistor 19 to a zener diode 20 which is shunted by filter capacitor 21.

The regulated voltage appearing across zener diode 20 is applied to, and energizes, a horizontal oscillator 22. Pulses produced by the oscillator are amplified by means of an output stage 23 and applied to the primary winding 24 of a horizontal output transformer 25. A deflection yoke 26 is connected to a secondary winding 27 of the horizontal output transformer and receives ramp-like scansion signals from the transformer for effecting the scansion or deflection of an electron beam across the face of a picture tube. An auxiliary winding 28 is provided on the horizontal output transformer 25 and feeds back the ramp-like scansion signals through a resistor 29 and rectifier 30, shunted by a damping capacitor 31, to a regulating transistor 32. A reservoir capacitor 33 is coupled between the rectifier output and ground, absorbing charge during the conduction of the rectifier 30 and giving it up during periods of non-conduction so as to lessen voltage excursions occurring between the rectified scansion signals to be presented to transistor 32. A further resistor 34 couples the base of transistor 32 to a point of unregulated voltage, and a diode 35 connects the base terminal to the ungrounded side of zener diode 20. A current limiting resistor 36 is connected to the emitter terminal of transistor 32, and a second diode 37 connects the distal end of resistor 36 to the base terminal of the transistor. An output terminal 38, connected to the emitter of transistor 32 by way of resistor 36, serves to provide the necessary regulated DC voltage for energizing other signal processing circuitry of the receiver (not shown).

The operation of the illustrated circuit will now be described, with reference to the enumerated elements of the drawing. In order to energize the receiver, a suitable line voltage is connected across terminals 10 and 11. On-off switch 12 is closed, allowing power to flow through the system. The AC voltage is rectified by diode 13 and filtered by subsequent filtering means including capacitors 16 and 17 and inductor 15. The rectified, filtered DC voltage, which may now have a value of approximately 135 volts, is made available to those portions of the receiver requiring a relatively high DC voltage by way of terminal 18.

The unregulated high voltage is further applied to horizontal output stage 23 and is transmitted through a resistor 19 to the cathode end of zener diode 20. The zener diode may advantageously be selected to provide a relatively constant voltage drop of approximately 22 volts thereacross, regardless of excursions in the unregulated voltage applied thereto by way of resistor 19. To prevent transient voltages from appearing across the zener diode, a filter capacitor 21 is connected in parallel therewith. Current at the zener diode voltage is then applied to horizontal oscillator 22, energizing the oscillator such that a train of pulses at a suitable horizontal scansion frequency are produced at the output thereof. The pulses are then amplified by horizontal output stage 23. It will be seen that power for the amplification effected by the horizontal driver stage is derived from the high-voltage DC power, so that the least possible current flow is maintained through resistor 19.

Pulses produced by output stage 23 are applied to the primary winding 24 of horizontal output transformer 25. These pulses appear in the secondary winding 27 of the horizontal output transformer as ramp-like or sawtooth scansion signals. The scansion signals are transmitted from secondary winding 27 to yoke 26. As is common in the art, yoke 26 comprises a set of deflection windings disposed on opposite sides of the neck of a cathode ray tube which produce a time-varying magnetic field in response to current supplied from the horizontal output transformer. The sawtooth scansion signals produce a linearly increasing magnetic field about the deflection windings which causes a periodic deflection, or scansion, of an electron beam across the face of the cathode ray tube. At the end of each scansion signal, the pulses produced by horizontal output stage 23 are suddenly terminated, and a sharp pulse of substantial magnitude appears in the secondary windings of horizontal output transformer 25. This pulse, termed a flyback pulse, arises due to the sudden collapse of the magnetic field about the windings of the yoke and the transformer. Separate windings (not shown) may be provided in transformer 25 for deriving a high voltage from the flyback pulses since they are a readily available source of high-voltage energy.

The present invention contemplates the use of an auxiliary winding 28 for deriving power from the horizontal transformer. Power is derived not from the commonly utilized flyback pulses, but from the same scansion signals that are utilized to operate the deflection yoke. The duty cycle of the scansion signals is substantially greater than that of the flyback pulses. The scansion signal occurs during substantially five-sixths of the signal period, while the flyback pulse occurs for only approximately one-sixth of the period. Supply voltages may be derived more efficiently, and with less ripple, from the scansion signals than from the flyback pulses. The scansion signals thus derived are fed back by means of a limiting resistor 29 to a properly-poled rectifier 30, here shown as a simple diode. A capacitor 31 is placed in shunt about diode 30 for damping out high-frequency oscillations that arise thereacross due to the inherently non-linear operation of the diode. The rectified and smoothed voltage provided by rectifier 30 and capacitors 31 and 33 is applied to the collector terminal of transistor 32 and is conducted thereacross in accordance with the voltage upon the base terminal of the transistor, and appears at the emitter terminal thereof. If an unregulated voltage is applied to the base terminal, the voltage appearing at the emitter terminal would be similarly unregulated, contrary to what is required. It is therefore desirable to connect the base terminal of transistor 32 to a point of regulated voltage, here the cathode of zener diode 20.

If no more than this were done, however, current flowing from the line voltage source through resistor 19 would be presented with two parallel paths; one through the reverse-connected zener diode 20, and another through the base-emitter junction of regulator transistor 32. Transistor 32 would thus present a relatively low-impedance path to the main power supply connected thereto and therefore would be essentially in parallel with zener diode 20. Under such circumstances it would be extremely difficult, if not impossible, to provide the desired regulated voltage at the emitter of transistor 32 in the absence of a large zener diode capable of serving the entire receiver. The use of such a zener diode, however, is what was intended to be avoided through the use of the regulating transistor 32.

In order to provide a regulated voltage to the base, and to avoid forward-biasing the base-emitter junction thereof, diode 35 is interposed between the base of transistor 32 and the cathode of zener diode 20. Further, in order to provide the necessary biasing current to the base terminal, the base is connected directly to a source of unregulated voltage by way of resistor 34. Resistor 34 serves to substantially limit the current available to the transistor 32 to that amount normally necessary for the current drawn from the emitter thereof, as determined by the forward gain of the transistor. While the rightward end of resistor 34 is at a relatively high potential, should the leftward or base end tend to exceed the regulated voltage provided by zener diode 20, diode 35 will be forward-biased. Diode 35 thus prevents unwanted current flow through the base-emitter junction of transistor 32, while preventing the base thereof from exceeding the regulated voltage provided by the zener diode.

A still further advantage inheres in the disclosed circuit. It will be understood that devices such as diode 35 have a characteristic forward voltage drop which is commonly of the order of magnitude of 0.7 volts. Similarly, most transistors such as transistor 32 have a characteristic base-emitter voltage drop which is of the same order of magnitude, i.e., approximately 0.6 volts. Therefore, while the voltage of the base terminal of transistor 32 exceeds the regulated voltage appearing across zener diode 20 by an amount nearly equal to the forward voltage drop across diode 35, this incrementally higher voltage is substantially offset by the base-emitter voltage drop so that the emitter terminal of transistor 32 is very nearly identical to that arising at the cathode of zener diode 20. A further advantage of the illustrated arrangement, wherein the base-emitter voltage drop of transistor 32 and the forward voltage drop of diode 35 are in opposition, is that thermally related variations in these voltages substantially cancel one another. Since the thermal characteristics of the base-emitter junction of transistor 32 are substantially similar to those of the junction within diode 35, the voltage drops thereacross change in the same manner so that temperature-related voltage variations are compensated for.

It should be recognized that, while the unregulated voltage applied to the base terminal of transistor 32 by way of resistor 34 and that applied to diode 20 by means of resistor 19 are shown as originating from the same point, it is not necessary that they be identical or even derived from the same source. In fact, any voltage within a broad range of potentials may be applied to the base terminal of transistor 32 through a suitable current limiting resistor, the presence of diode 35 serving to ensure that the base potential will follow that of zener diode 20 regardless of independent fluctuations in the value of the unregulated voltage coupled to the base.

While current limiting resistor 36 and diode 37 are not necessary to the normal operation of the circuit shown, they are desirable to protect transistor 32 against inordinately high currents which may arise due to the failure of a circuit coupled to output terminal 38. Should the current through the emitter of transistor 32 rise to an unacceptably high value, the voltage drop across resistor 36, added to the base-emitter voltage drop of transistor 32, will reach a value which exceeds the voltage drop from the anode to the cathode of diode 37 by a sufficient magnitude to force diode 37 to become forward-biased, shunting the base current of transistor 32.

It will therefore be seen that the present circuit provides an initial, regulated voltage suitable for driving horizontal oscillator 22. A relatively inexpensive zener diode 20 may be utilized along with a large resistor 19 sized to allow just enough current flow to operate horizontal oscillator 22. In one embodiment successfully tested, the current flow to the horizontal oscillator was of the order of magnitude of 10 milliamps so that the voltage drop across resistor 19, when added to the normal voltage drop across zener diode 20, approximated the unregulated rectified line voltage. The total current required for driving other portions of the receiver circuit is typically in the magnitude of 22 times that required for the horizontal oscillator alone. Since this current is obtained from scansion signals derived from horizontal output transformer 25, it is now evident that a much smaller and more economical means for deriving the initial, regulated low voltage need be provided than would be the case if all of the regulated voltage were to be derived directly from line voltage.

While it will be understood that values of the various circuit components may be varied to suit a particular application, the following values of circuit components are given by way of example:

| | |
|---|---|
| Resistors | |
| 19 | 8.2 kilohms |
| 29 | 5.6 ohms |
| 34 | 12 kilohms |
| 36 | 0.47 ohms |
| Capacitors | |
| 14 | 0.001 microfarad |
| 16 | 300 microfarads |
| 17 | 200 microfarads |
| 21 | 100 microfarads |
| 31 | 470 picofarads |
| 33 | 100 microfarads |
| Diodes | |
| 13 | Type A14 |
| 30 | V09 (Hitachi) |
| 35 | 1N 4446 |
| 37 | 1N 4446 |
| Zener Diode 20 | 1N5358A (Motorola) |
| Transistor 32 | Type D44C6 (General Electric) |
| Inductor 15 | 0.5 henrys |

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

We claim:

1. In a television receiver including oscillator means and deflection drive means for producing scan voltages to effect scansion of an electron beam across the face of a cathode ray tube, means for applying a regulated operating voltage to the oscillator means and for providing a regulated DC voltage derived from said scan voltages, comprising:

fixed voltage developing means, regulator amplifying means having first, second and control terminals, coupling means coupling the fixed voltage developed by said fixed voltage developing means to said oscillator means and to said control terminal, means for supplying an unregulated voltage to said deflection drive means, means for supplying an unregulated voltage to said control terminal, said coupling means holding the voltage at said control terminal substantially at said fixed voltage and limiting the current available to said control terminal, means to derive a DC voltage proportional to said scan voltages and to apply said DC voltage to said first terminal, whereby a regulated voltage controlled by said fixed voltage is provided at said second terminal.

2. The invention defined in claim 1, wherein said coupling means includes a diode connected to said fixed voltage developing means, said diode permitting said control terminal to be energized by said unregulated voltage and holding the voltage at said control terminal substantially at said fixed voltage.

3. The invention defined in claim 2, wherein said regulator amplifying means is a transistor, the control terminal thereof being the base electrode of said transistor, and said fixed voltage developing means is a zener diode, said diode being connected between said zener diode and the base electrode of said transistor to permit said transistor to be energized by the unregulated voltage applied to this control terminal and holding the voltage level at the base electrode substantially at the fixed voltage established by said zener diode.

* * * * *